United States Patent
Arroyo et al.

(10) Patent No.: US 11,694,209 B2
(45) Date of Patent: *Jul. 4, 2023

(54) NOTIFYING A USER ABOUT RELEVANT DATA FOR OPPORTUNITIES

(71) Applicant: International Business Machines Corporation, Armonk, NY (US)

(72) Inventors: Jorge A. Arroyo, Carmel, IN (US); Stephen P. Kruger, Dublin (IE); Patrick J. O'Sullivan, Dublin (IE); Luciano Martins Pereira da Silva, Apex, NC (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 860 days.

This patent is subject to a terminal disclaimer.

(21) Appl. No.: 14/272,215

(22) Filed: May 7, 2014

(65) Prior Publication Data

US 2015/0324859 A1    Nov. 12, 2015

(51) Int. Cl.
    *G06Q 30/01*    (2023.01)
    *G06F 16/24*    (2019.01)
    *G06F 16/2457*    (2019.01)
    *G06F 16/907*    (2019.01)

(52) U.S. Cl.
    CPC ............. *G06Q 30/01* (2013.01); *G06F 16/24* (2019.01); *G06F 16/24578* (2019.01); *G06F 16/907* (2019.01)

(58) Field of Classification Search
    CPC ......... G06F 17/30997; G06F 17/30386; G06F 17/3053; G06Q 30/00; G06Q 30/0269
    See application file for complete search history.

(56) References Cited

U.S. PATENT DOCUMENTS

| | | | |
|---|---|---|---|
| 8,165,911 B1* | 4/2012 | Sanil .................. | G06Q 30/0205 705/7.34 |
| 8,175,909 B1 | 5/2012 | Pileri | |
| 2012/0130809 A1 | 5/2012 | Tedjamulia et al. | |
| 2012/0323639 A1* | 12/2012 | Sabharwal ........... | G06Q 10/067 705/7.38 |
| 2013/0080344 A1* | 3/2013 | Jones ..................... | G06Q 10/06 705/317 |
| 2015/0170163 A1* | 6/2015 | Wagner .............. | G06Q 30/0201 705/7.29 |

OTHER PUBLICATIONS

"Least Criteria Record Matching in Database Systems" Scott James, Moe Bidgoli, John C. Hansen.*
List of IBM Patents or Patent Applications Treated as Related, May 27, 2015, pp. 1-2.

* cited by examiner

*Primary Examiner* — Victoria E. Frunzi
(74) *Attorney, Agent, or Firm* — Steven L. Nichols; Fabian VanCott (57) ABSTRACT

Notifying a user about relevant data for opportunities includes obtaining, from a database, opportunities, the opportunities representing a complex record structure in the database, in which each of the opportunities captures a number of fields of metadata, analyzing the metadata associated with the opportunities to identify patterns for the opportunities, identifying, based on the patterns, correlations for the opportunities, and notifying, based on the correlations, the user about relevant data for the opportunities.

16 Claims, 5 Drawing Sheets

NOTIFYING A USER ABOUT RELEVANT DATA FOR OPPORTUNITIES

BACKGROUND

The present invention relates to notifying a user about relevant data, and more specifically, to notifying a user about relevant data for opportunities.

A customer relationship management (CRM) system uses techniques and methods to gather, organize, automate, and synchronize sales, for marketing, customer service, and technical support. The CRM system stores this information in a database. Further, this information is retrieved from the database and analyzed to allow a company to better target various customers.

BRIEF SUMMARY

A method for notifying a user about relevant data for opportunities includes obtaining, from a database, opportunities, the opportunities representing a complex record structure in the database, in which each of the opportunities captures a number of fields of metadata, analyzing the metadata associated with the opportunities to identify patterns for the opportunities, identifying, based on the patterns, correlations for the opportunities, and notifying, based on the correlations, the user about relevant data for the opportunities.

A system for notifying a user about relevant data for opportunities includes an obtaining engine to obtain, from a database, opportunities, the opportunities representing a complex record structure in the database, in which each of the opportunities captures a number of fields of metadata, a determining engine to determine a maturity level for each of the opportunities, an analyzing engine to analyze the metadata associated with the opportunities to identify patterns for the opportunities, an identifying engine to identify, based on the patterns, correlations for the opportunities, an applying engine to apply a weight to the metadata associated with each of the opportunities to determine relevant data that is used to notify a user, a notifying engine to notify, based on the correlations, the user about the relevant data for the opportunities, and an updating engine to update the database with the correlations and the relevant data associated with the opportunities.

A computer program product includes a computer readable storage medium, the computer readable storage medium having computer readable program code embodied therewith. The computer readable program code having computer readable program code to analyze metadata associated with opportunities to identify patterns for opportunities, identify, based on the patterns, correlations for the opportunities, and notify, based on the correlations, a user about relevant data for the opportunities.

BRIEF DESCRIPTION OF THE SEVERAL VIEWS OF THE DRAWINGS

The accompanying drawings illustrate various examples of the principles described herein and are a part of the specification. The examples do not limit the scope of the claims.

Throughout the drawings, identical reference numbers designate similar, but not necessarily identical, elements.

DETAILED DESCRIPTION

The present specification describes a method and system for notifying a user about relevant data, such that opportunities with a less mature maturity level avoid potential issues that opportunities with a more mature maturity level encountered previously.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

As noted above, the customer relationship management (CRM) system uses techniques and methods to organize, automate, and synchronize sales, for marketing, customer service, and technical support. This information that the CRM system gathers is stored in a database. Further, this information may be categorized as opportunities in the database. A user associated with a company may view the opportunities gather by the CRM system to allow the company to better target various customers.

Often the database contains thousands of opportunities. Further, some of the opportunities may be related to other opportunities. For example, the database may include opportunity A, opportunity B, and thousands of other opportunities. Opportunity A may be a product for a first customer that includes Hardware X version two. Opportunity B may be a product for a second customer that includes Hardware X version one. Information associated with opportunity A may be used to aid the success of opportunity B, if the second customer is going to upgrade to Hardware X version two in the near future. However, with thousands of opportunities in the database, the user manually analyzes all the opportunities to determine if one opportunity is related to another opportunity. This can be a burdensome task for the user.

The principles described herein include a system and a method for notifying a user about relevant data for opportunities. Such a system and method include obtaining, from a database, opportunities, the opportunities representing a complex record structure in the database, in which each of the opportunities captures a number of fields of metadata, analyzing the metadata associated with the opportunities to identify patterns for the opportunities, identifying, based on the patterns, correlations for the opportunities, and notifying, based on the correlations, a user about relevant data for the opportunities. Such a system and method allows opportunities with a more mature maturity level to guide the opportunities with a less mature maturity level. As a result, the opportunities with a less mature maturity level avoid the potential issues that the opportunities with a more mature maturity level encountered previously.

In the specification and appended claims, the term "opportunities" is meant to be understood broadly as a complex record structure in a database, in which each of the opportunities captures a number of fields of metadata. In one example, the opportunities may include a business's sales and/or interaction with current customers, future customers, or combinations thereof.

In the specification and appended claims, the term "maturity level" is meant to be understood broadly as a stage of development for an opportunity. In one example, the maturity level may be a range such as 0 to 10, where 0 represents the least mature maturity level for an opportunity and 10 represents the most mature maturity level for an opportunity. In another example, the maturity level may be symbolic such as least mature maturity level, less mature maturity level, more mature maturity level, and most mature maturity level, among others.

In the specification and appended claims, the term "metadata" is meant to be understood broadly as information that is associated with an opportunity. In one example, metadata for each of the opportunities includes a design specification, a platform specification, a fixpack specification, a version specification, an operating system (OS) specification, a time line, a risk, a cost, a performance result, an integration middleware specification, members associated with the opportunities, an upgrade, a product, a staging, other metadata, or combinations thereof. In one example, a weight may be applied to specific metadata associated with the opportunities to determine the relevant data that is used to notifying the user. For example, if a user is very interested in metadata for performance results, the user may apply a weight to the performance results. The weight may be a range from 0 to 10, where 0 represents no weight to be applied to the metadata and 10 represents the greatest weight to be applied to the metadata.

In the specification and appended claims, the term "relevant data" is meant to be understood broadly as information to aid the user in maximizing the success for each of the opportunities. In one example, the user may receive the relevant data as a notification. For example, the user may receive the relevant data via a user interface (UI), electronic mail (email), an alert, other methods, or combinations thereof.

In the following description, for purposes of explanation, numerous specific details are set forth in order to provide a thorough understanding of the present systems and methods. It will be apparent, however, to one skilled in the art that the present apparatus, systems, and methods may be practiced without these specific details. Reference in the specification to "an example" or similar language means that a particular feature, structure, or characteristic described in connection with that example is included as described, but may not be included in other examples.

Figure 1:
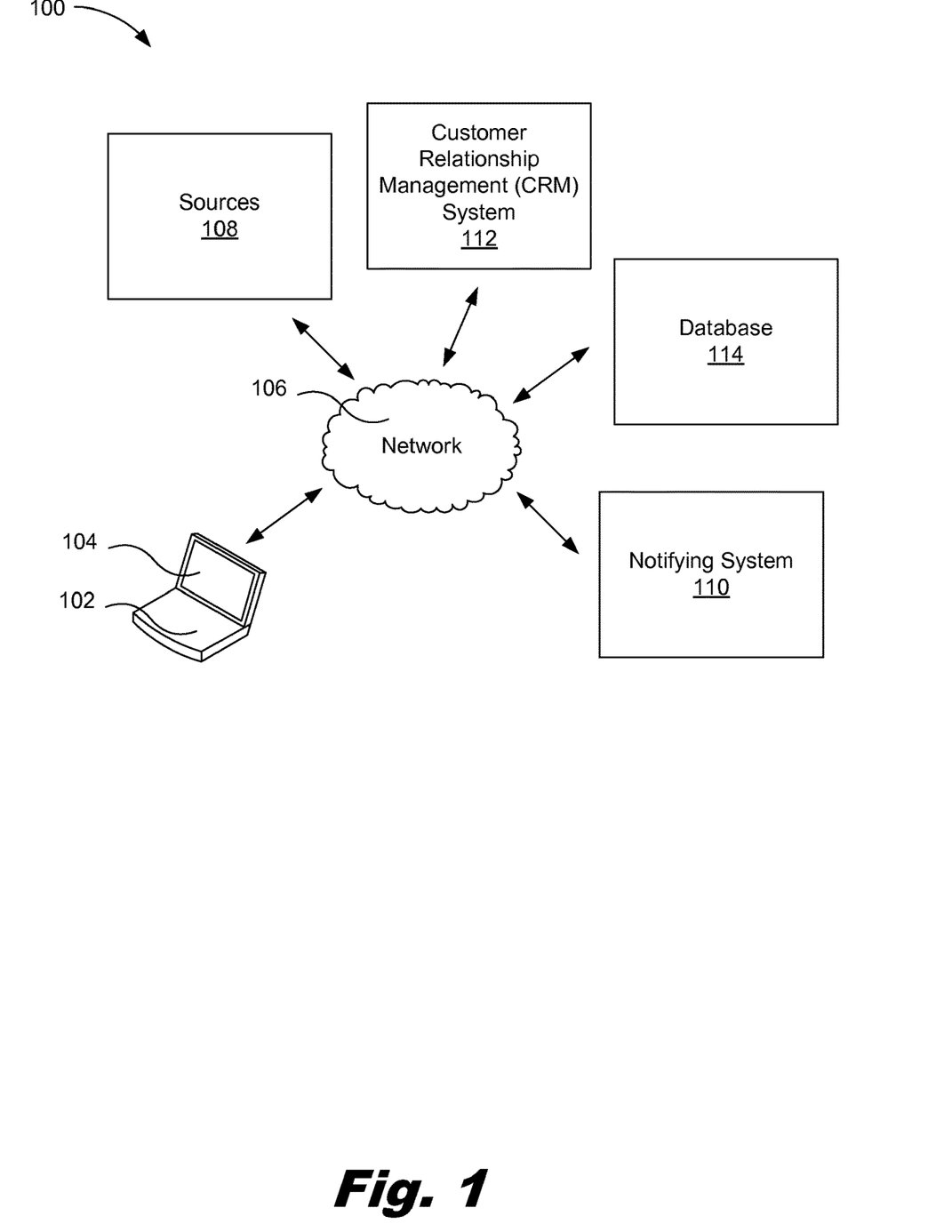
FIG. 1 is a diagram of an example of a system for notifying a user about relevant data for opportunities, according to one example of principles described herein.

Referring now to the figures, FIG. 1 is a diagram of an example of a system for notifying a user about relevant data for opportunities, according to one example of principles described herein. As will be described below, a notifying system is in communication with a network to obtain, from a database, opportunities, the opportunities representing a complex record structure in the database, in which each of the opportunities captures a number of fields of metadata. Further, the notifying system analyzes the metadata associated with the opportunities to identify patterns for the opportunities and notifies a user about relevant data for opportunities.

As illustrated in FIG. 1, the system (100) includes a CRM system (112). In one example, the CRM system (112) is used as a model for managing a business's interactions with current and future customers. The CRM system (112) uses techniques and methods to organize, automate, and synchronize sales, for marketing, customer service, and technical support. In one example, the CRM system (112) monitors sources (108) such as current customers and potentially future customers to gather information to better target various customers.

In another example, the CRM system (112) monitors sources (108) such as social media sources. In this example, the CRM system's strategy is based around customer engagement and interactions, with transactions being a byproduct. In this example, the CRM system (112) is a back-end process and system for managing customer relationships and data in an efficient and process-centric way. The CRM system (112) is able to understand the business's challenges that are to be solved, and then solving the challenges. Further, the CRM system (112) may be one component of developing a social or collaborative business, both internally and externally.

In one example, all the information that the CRM system (112) gathers is stored in a database (114). Further, the database (114) may be a relational database. As will be described in FIG. 2 and later parts of this specification, the information may be stored as opportunities. As mentioned above, the opportunities represent a complex record structure in the database, in which each of the opportunities captures a number of fields of metadata. In one example, the database (114) stores, in memory, thousands of opportunities.

As illustrated in FIG. 1, the system (100) includes a notifying system (110). The notifying system (110) obtains, from the database (114), opportunities, the opportunities representing a complex record structure in the database (114), in which each of the opportunities captures a number of fields of metadata. As will be described in other parts of this specification, hundreds of fields of metadata may be associated with each opportunity.

Further, the notifying system (110) analyzes the metadata associated with the opportunities to identify patterns for the opportunities. In one example, the notifying system (110) compares metadata for an opportunity having a less mature maturity level with metadata for an opportunity having a more mature maturity level to identify patterns for the opportunities.

The notifying system (110) further identifies, based on the patterns, correlations for the opportunities. In one example, the patterns may indicate that there is an overlap of metadata for an opportunity having a less mature maturity level and an opportunity having a more mature maturity level. As a result, a correlation is formed for these opportunities.

Further, the notifying system (110) notifies, based on the correlations, a user about relevant data for the opportunities. In one example, a notification may be sent from the notifying system (110) to a user device (102). The notification may be a UI that is displayed on a display (104). Such a system (100) allows opportunities with a more mature maturity level to guide the opportunities with a less mature maturity level. As a result, the opportunities with a less mature maturity level avoid the potential issues that the opportunities with a more mature maturity level encountered previously. More information about the notifying system (110) will be described in later parts of this specification.

While this example has been described with reference to the notifying system being located over the network, the notifying system may be located in any appropriate location. For example, the notifying system may be located in a user device, a database, a CRM system, other locations, or combinations thereof.

Figure 2:
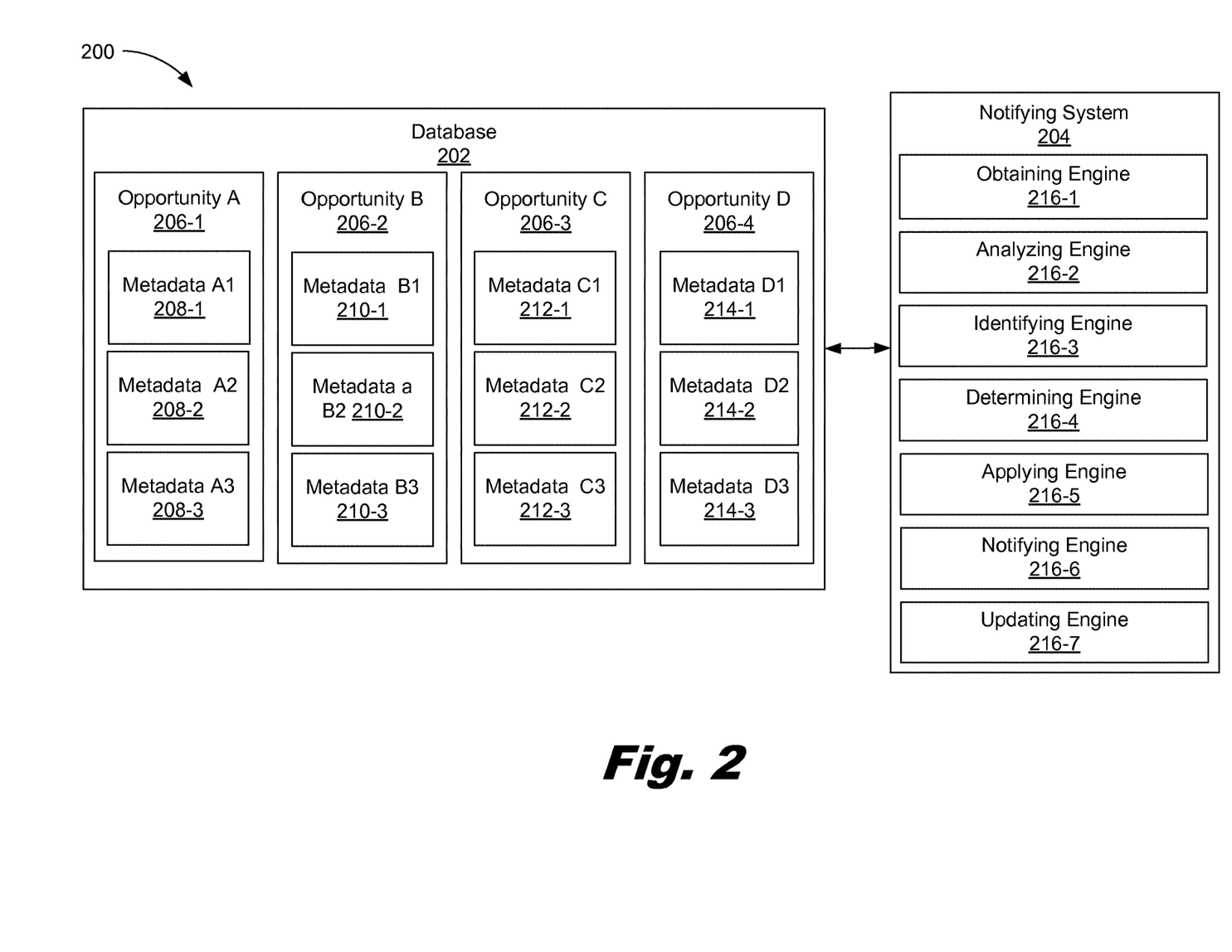
FIG. 2 is a diagram of an example of a system for notifying a user about relevant data for opportunities, according to one example of principles described herein.

FIG. 2 is a diagram of an example of a system for notifying a user about relevant data for opportunities, according to one example of principles described herein. As mentioned above, all the information that the CRM system gathers is stored in a database. Further, the information, stored in the database, may be stored as opportunities.

As illustrated in FIG. 2 the database (202) includes a number of opportunities (206). As mentioned above, the opportunities represent a complex record structure in the database, in which each of the opportunities captures a number of fields of metadata. In this example, the opportunities (206) may include opportunity A (206-1), opportunity B (206-2), opportunity C (206-3), and opportunity D (206-4).

In one example, the opportunities (206) include metadata that is associated with each of the opportunities (206). For example, opportunity A (206-1) includes metadata A1 (208-1), metadata A2 (208-2), metadata A3 (208-3). Opportunity B (206-2) includes metadata B1 (210-1), metadata B2 (210-2), metadata B3 (210-3). Opportunity C (206-3) includes metadata C1 (212-1), metadata C2 (212-2), metadata C3 (212-3). Opportunity D (206-1) includes metadata D1 (214-1), metadata D2 (214-2), metadata D3 (214-3).

The metadata (208, 210, 212, 214) for each of the opportunities (206) may include a design specification, a platform specification, a fixpack specification, a version specification, an OS specification, a time line, a risk, a cost, a performance result, an integration middleware specification, members associated with the opportunities, an upgrade, a product, a staging, other metadata, or combinations thereof.

As illustrated in FIG. 2, the system (200) includes a notifying system (204). The notifying system (204) includes a number of engines (216). The engines (216) refer to a combination of hardware and program instructions to perform a designated function. Each of the engines (216) may include a processor and memory. The program instructions are stored in the memory and cause the processor to execute the designated function of the engine. As illustrated, the notifying system (204) includes an obtaining engine (216-1), an analyzing engine (216-2), an identifying engine (216-3), a determining engine (216-4), an applying engine (216-5), a notifying engine (216-6), and an updating engine (216-7).

In one example, the obtaining engine (216-1) obtains, from the database (202), opportunities (206), the opportunities (206) representing a complex record structure in the database, in which each of the opportunities captures a number of fields of metadata (208, 210, 212, 214). In this example, opportunity A (206-1), opportunity B (206-2), opportunity C (206-3), and opportunity D (206-4) are obtained by the obtaining engine (216-1).

In one example, opportunity A (206-1) is a sales opportunity in Siebel that captured a closed deal for a customer that includes product version eight, enhancement version seven. Associated with opportunity A (206-1) is substantial metadata (208) that includes things like version information, fixpack information, platform information, issues discerned and solved and solutions to these, areas of potential risk, among others.

In this example, opportunity B (206-2) is a customer from 2 years back and captures a deal for product version seven, enhancement version six. This customer is about to upgrade to product version eight, enhancement version seven as indicated by the metadata (210).

In this example, opportunity C (206-3) and opportunity D (206-4) are not related to each other or to opportunity A (206-1) or opportunity B (206-2). As will be described below, the notifying system (204) will notify the user of relevant data for opportunity A (206-1) and opportunity B (206-2).

As mentioned above, the notifying system (204) includes an analyzing engine (216-2). The analyzing engine (216-2) analyze the metadata (208, 210, 212, 214) associated with the opportunities (206) to identify patterns for the opportunities (206). In one example, the analyzing engine (216-2) analyze the metadata (208, 210, 212, 214) associated the with opportunities (206) to identify patterns by comparing metadata for an opportunity having a less mature maturity level with metadata for an opportunity having a more mature maturity level. As will be described in below, the determining engine (216-4) determines a maturity level for the opportunities. For example, if opportunity A (206-1) has a more mature maturity level than opportunity B (206-2), the metadata (208, 210) for opportunity A (206-1) and opportunity B (206-2) are compared. By comparing the metadata (208, 210) for opportunity A (206-1) and opportunity B (206-2) patterns of success and failures may be determined.

For example, opportunity B (206-2) may be tagged as potentially relevant to opportunity A (206-1). Both opportunity A (206-1) and opportunity B (206-2) are different in terms of scope, opportunity A (206-1) is larger than opportunity B (206-2), there is an underlying footprint in opportunity B (206-2) that can be seen in opportunity A (206-1). As a result, opportunity B (206-2) is about to travel a subset of the path that opportunity A (206-1) has already traveled. Within this subset there is information in opportunity A (206-1) that can benefit opportunity B (206-2). For example, if the pattern in this subset in opportunity A (206-1) discerned issues which were fixed, opportunity B (206-2) can benefit from this knowledge.

As illustrated, the notifying system (204) includes the identifying engine (216-3). The identifying engine (216-3) identifies, based on the patterns, correlations for the opportunities. For example, if opportunity A (206-1) indicates patterns of success and failures and opportunity B (206-2) is six months behind opportunity A (206-1) a correlation may be identified.

As mentioned above, the determining engine (216-4) determines maturity levels for the opportunities (216-4). In one example, by determining maturity levels for the opportunities (216-4), opportunities that are have a more mature maturity level can aid the progress of opportunities that are have a less mature maturity level.

As illustrated, the notifying system (204) includes the applying engine (216-5). The applying engine (216-5) applies a weight to the metadata associated with the opportunities to determine the relevant data that is used to notifying the user. For example, if a user is very interested in the performance results, the user may apply a weight to all metadata associated with the performance results. The weight may be a range from 0 to 10, where 0 represents no weight to be applied to the metadata and 10 represents the greatest weight to be applied to the metadata.

The notifying system (204) includes the notifying engine (216-6). The notifying engine (216-6) notifies, based on the correlations, the user about relevant data for the opportunities. In one example, the notifying engine (216-6) notifies the user via a UI, an email, an alert, other notification methods, or combinations thereof. In this example, the user may be notified about the successes and failures of opportunity A (206-1) to aid the success of opportunity B (206-2).

As mentioned above, the notifying system (204) includes updating engine (216-7). The updating engine (216-7) updates the database (202) with the correlations and the relevant data associated with the opportunities. In this example, the correlations and relevant data associated with opportunity A (206-1) and opportunity B (206-2). As a result, the database (202) is maintained such that the notification system (204) does not have to reanalyze the database (202) constantly.

Figure 3:
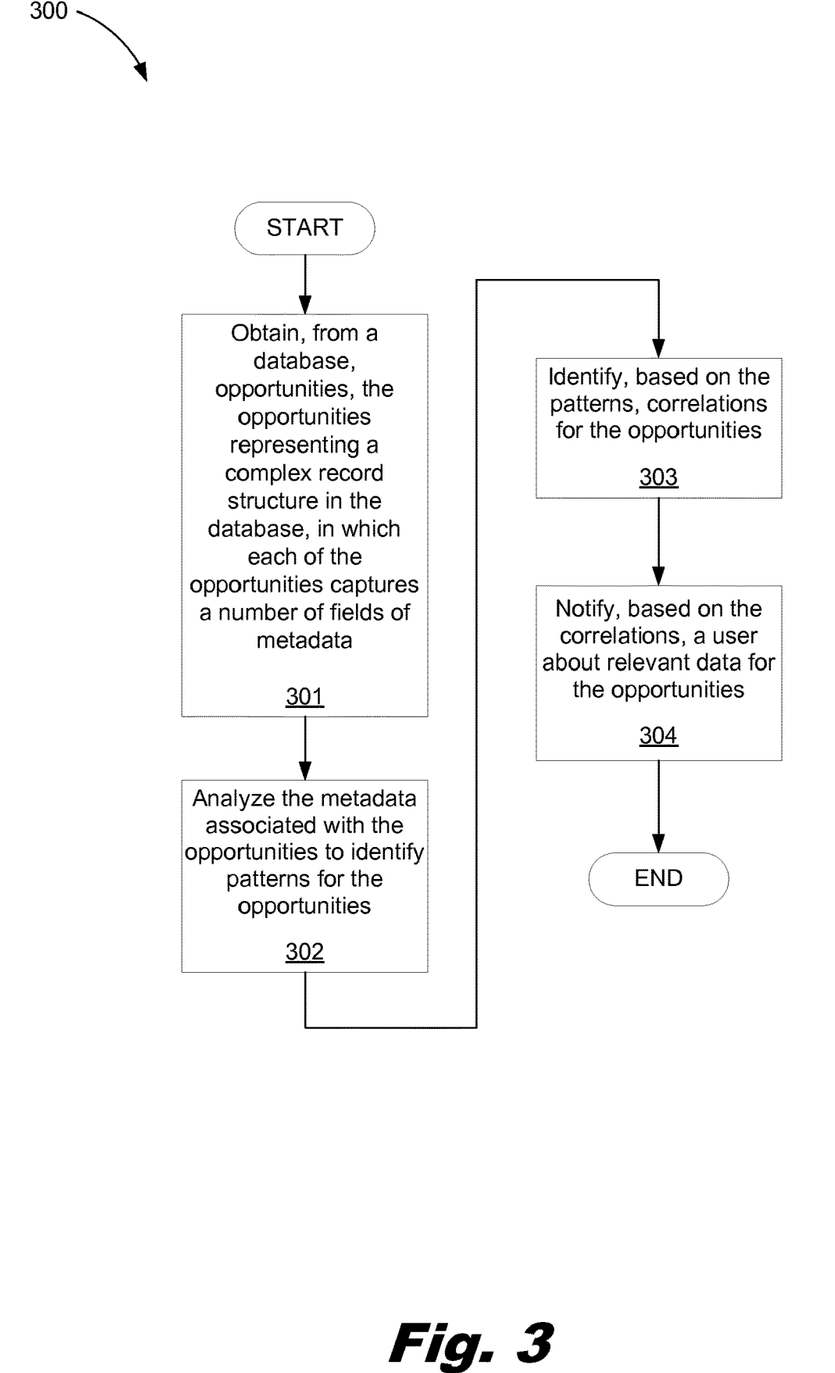
FIG. 3 is a flowchart of an example of a method for notifying a user about relevant data for opportunities, according to one example of principles described herein.

FIG. 3 is a flowchart of an example of a method for notifying a user about relevant data for opportunities, according to one example of principles described herein. In one example, the method (300) may be executed by the notifying system (100) of FIG. 1. In other examples, the method (300) may be executed by other system (i.e. system 500 and system 600). In this example, the method (300) includes obtaining (301), from a database, opportunities, the opportunities representing a complex record structure in the database, in which each of the opportunities captures a number of fields of metadata, analyzing (302) the metadata associated with the opportunities to identify patterns for the opportunities, identifying (303), based on the patterns, correlations for the opportunities, and notifying (304), based on the correlations, a user about relevant data for the opportunities.

As mentioned above, the method (300) includes obtaining (301), from a database, opportunities, the opportunities representing a complex record structure in the database, in which each of the opportunities captures a number of fields of metadata. As mentioned above, a CRM system is used as a model for managing a business's interactions with current and future customers. The CRM system uses techniques and methods to organize, automate, and synchronize sales, for marketing, customer service, and technical support. In one example, the CRM system may be a classical CRM system that monitors sources such as current customers and potentially future customers to gather information to better target various customers. The classical CRM system traditionally includes a one-way communication between a business and the customer.

In another example the CRM system may be a social CRM system that monitors sources such as social media sources. In this example, the social CRM system's strategy is based around customer engagement and interactions, with transactions being a byproduct. In one example, the Social CRM system may use a philosophy and a business strategy, supported by a technology platform, business rules, workflow, processes and social characteristics, designed to engage the customer in a collaborative conversation in order to provide mutually beneficial value in a trusted and transparent business environment. Further, the social CRM system includes applications in marketing, customer service and sales, including peer-to-peer customer support, idea management, market research, product launch, brand reputation management.

In this example, the social CRM system is a back-end process and system for managing customer relationships and data in an efficient and process-centric way. The social CRM system is able to understand the business's challenges that are to be solved and then solve the business's challenges. Further, the social CRM system may be one component of developing a social or collaborative business, both internally and externally.

Regardless of if the CRM system is a classical CRM system or a social CRM system, they are used to gather information about opportunities and populate the database with the information gathered about the opportunities. Once, the database is populated, the method (300) can obtain the opportunities form the database for analysis.

As mentioned above, the method (300) includes analyzing (302) the metadata associated with the opportunities to identify patterns for the opportunities. In one example, opportunities can largely have common footprints and be at different maturity levels. For example, opportunities within a brand may be derived from approximately 30 products developed in the brand. Usually, customer opportunities will include some of these products. In a CRM system with thousands of opportunities the overlap on decisions customers make in products they choose will be high. Differences in these places of overlap can be attributed to metadata. In one example, the metadata for each of the opportunities may include a design specification, a platform specification, a fixpack specification, a version specification, an operating system (OS) specification, a time line, a risk, a cost, a performance result, an integration middleware specification, members associated with the opportunities, an upgrade, a product, a staging, other metadata, or combinations thereof.

In one example, the CRM system includes hundreds of thousands of opportunities that have both implicit and explicit sub-patterns that can be derived. As will be described below, once derived, these sub-patterns can be related to adjacent opportunities for the purposes of comparison, extrapolation, motivating change, ascertaining risk, avoiding failure, among others.

In one example, analyzing (302) the metadata associated with the opportunities to identify patterns for the opportunities includes the notion of sub setting and extracting relevant intersections. For example, wrapping a realm or boundary on an opportunity and spidering adjacent opportunities across the broader CRM system would be useful to extract behavior patterns that can potentially lead to a new sales impetus. Said differently, the knowledge guided in one realm can be used to identify adjacent realms such that sales opportunities can be guided by associating significant opportunities in one realm to guide maturity in another realm where the second realm is deemed sufficiently close and potentially 1-2 phases behind the first realm in terms of a maturity level or versioning.

In one example, a pattern may be identified by analyzing a superset of opportunities. The superset of opportunities may be based on significant variables to infer proximity to include combinations of products, combinations of versions, combinations of platforms, combinations of other non-functionals.

Further, data mining may be used to analyze the metadata. Data mining may be used to identify metadata that specific words, terms, phrases, or combinations thereof. For example, if the metadata for opportunity A includes terms such as platform X+1, version 3+1 and the metadata for opportunity B includes terms such as platform X, version 3, data mining may be used to identify a pattern between opportunity A and opportunity B.

As mentioned above, the method (300) includes identifying (303), based on the patterns, correlations for the opportunities. In one example, less and more mature opportunities can be correlated to find ways to take the less mature opportunity to the ideal exemplar opportunity, and to a path of least issues or resistance. For example, an opportunity that has fewer issues, a faster timeline, and a higher probability of success than another opportunity may be correlated with each other.

In this way the user could use correlations between opportunities to propose templates or pre-populated opportunities to inject into new opportunities which exhibit similar criteria. Further, the user could also identify additional upsell opportunities, leveraging similar deals, which products were sold and/or proposed, among others.

As mentioned above, the method (300) includes notifying (304), based on the correlations, a user about relevant data for the opportunities. In one example, the relevant data includes information to aid the user in maximizing the success for each of the opportunities. For example, the relevant data may be a cost, a schedule, a reduction of issues, a volume, retention, an issue, other relevant data, or combinations thereof. In one example, the relevant data may be used to aid the user in maximizing the success of an opportunity that has a less mature maturity level than another opportunity. In another example, the relevant data may be used to aid the user is maximizing the success of opportunities that have a more mature maturity level.

In one example, when notifying a user about relevant data for the opportunities, a relevant percentage may be displayed alongside the relevant data. For example, if the relevant data is upgrade product X to X+1, upgrade product X to X+1 is displayed along with a 75%. The 75% indicates how relevant the data is. In this example the relevant data is 75% relevant.

In one example, the user may be notified via an email. For example, if the method (300) identifies relevant data, the relevant data may be sent via email to the user. In another example, the user may be notified via a UI. For example, if the method (300) identifies relevant data, the relevant data may be displayed via the UI to the user.

While this example has been described with reference to notifying a user via email or a UI, other methods may be used to notify the user about relevant data. For example, the user may be notified via text message, via an alert, via a widget, via a program directly associated with the opportunity, among others.

Figure 4:
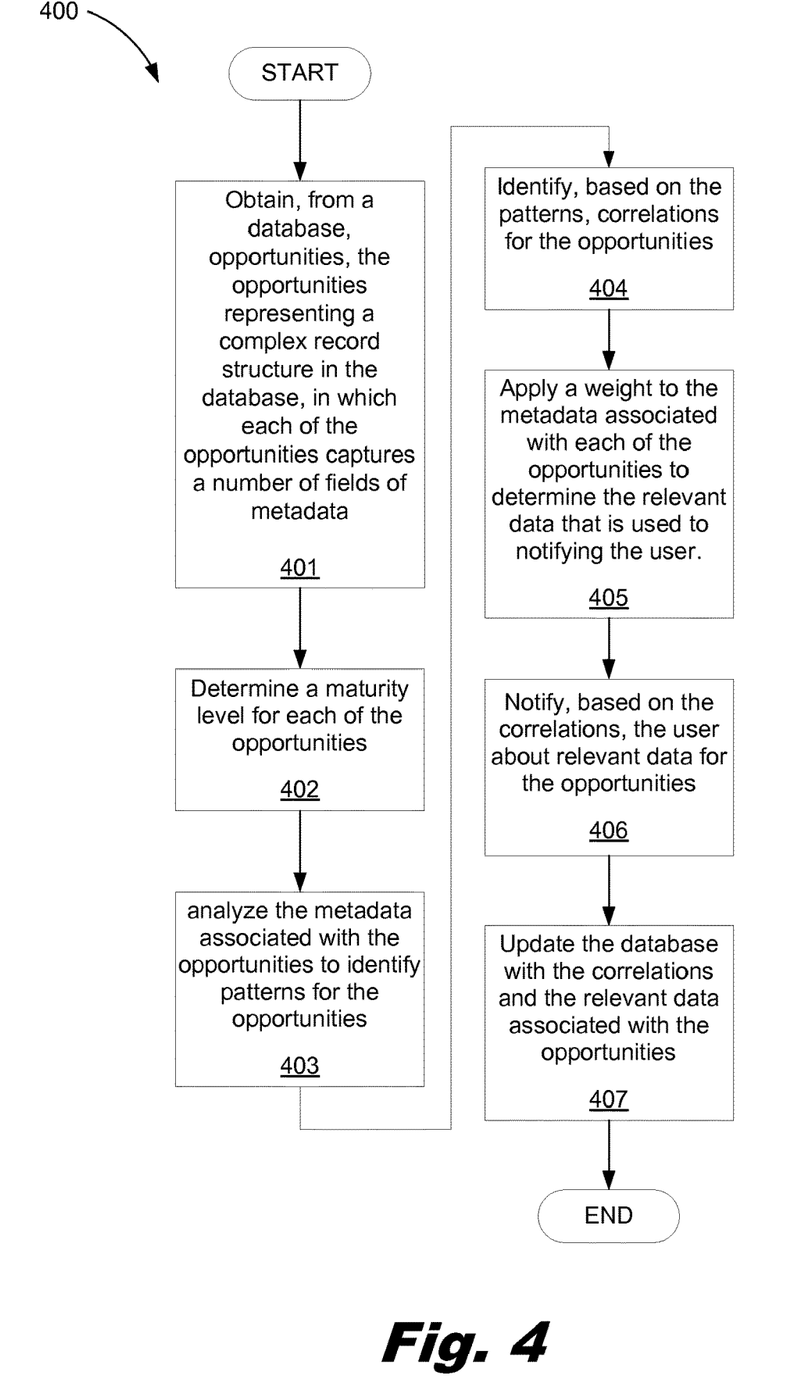
FIG. 4 is a flowchart of an example of a method for notifying a user about relevant data for opportunities, according to one example of principles described herein.

FIG. 4 is a flowchart of an example of a method for notifying a user about relevant data for opportunities, according to one example of principles described herein. In one example, the method (400) may be executed by the notifying system (100) of FIG. 1. In other examples, the method (400) may be executed by other system (i.e. system 500 and system 600). In this example, the method (400) includes obtaining (401), from a database, opportunities, the opportunities representing a complex record structure in the database, in which each of the opportunities captures a number of fields of metadata, determining (402) a maturity level for each of the opportunities, analyzing (403) the metadata associated with the opportunities to identify patterns for the opportunities, identifying (404), based on the patterns, correlations for the opportunities, applying (405) a weight to the metadata associated with each of the opportunities to determine the relevant data that is used to notify a user, notifying (406), based on the correlations, the user about relevant data for the opportunities, and updating (407) the database with the correlations and the relevant data associated with the opportunities.

As mentioned above, the method (400) includes determining (402) a maturity level for each of the opportunities. In one example, a maturity level may designate a stage of development for an opportunity. In one example, the maturity level may be a range such as 0 to 10, where 0 represents the least mature maturity level for an opportunity and 10 represents the most mature maturity level for an opportunity. In another example, the maturity level may be symbolic such as least mature maturity level, less mature maturity level, more mature maturity level, and most mature maturity level.

In one example, less and more mature opportunities can be correlated to find ways to take the less mature opportunity to the ideal exemplar opportunity and to a path of least issues and/or resistance. In one example, the maturity level may be based on factors, such as a time, the number of revisions, the number of failures, the number of successes, other factors, or combinations thereof.

As mentioned above, the method (400) correlates opportunities with less mature opportunities in these overlap situations with a view to inferring potential failure situations that can allow more mature opportunities that have demonstrated issues, to guide knowledge in less mature opportunities to avoid these issues. A simple example is a signature in a less mature opportunity where the customer is on Product X Version X Platform X alongside Product Y Version Y Platform Y and is about to upgrade to X+1 and Y+1 respectively. A more mature opportunity on the system may have exhibited issues in this upgrade combination, representing knowledge to the less mature opportunity, which surfaced in time can allow the earlier opportunity to be put in touch with the later opportunity to learn of the corrective processes to be applied so as to avoid the same issues.

As mentioned above, the method (400) includes applying (405) a weight to the metadata associated with each of the opportunities to determine the relevant data that is used to notify a user. In one example, a weight may be applied to the metadata associated with the opportunities to determine the relevant data that is used to notifying the user. For example, if a user is very interested in performance results, the user may apply a weight to all metadata associated with the performance results. The weight may be a range from 0 to 10, where 0 represents no weight to be applied to the metadata and 10 represents the greatest weight to be applied to the metadata.

As mentioned above, the method (400) includes updating (407) the database with the correlations and the relevant data associated with the opportunities. In one example, the updating engine of FIG. 2 updates the database with the correlations and the relevant data associated with the opportunities. As a result, the database is maintained such that the notification system of FIG. 2 does not have to reanalyze the opportunities in the database constantly.

Figure 5:
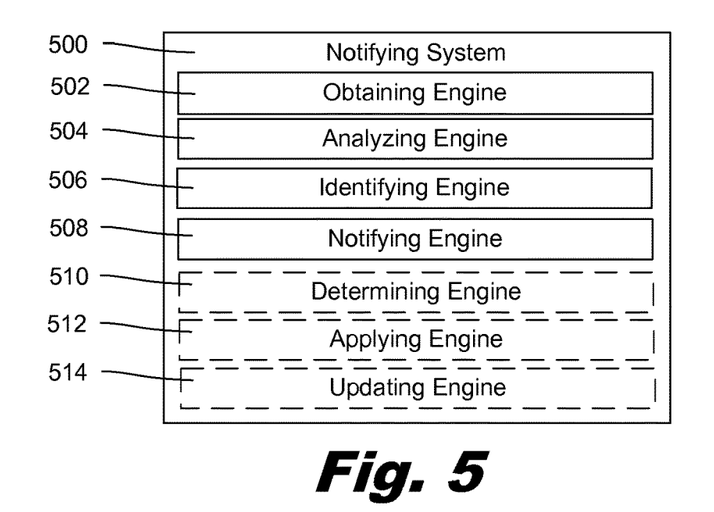
FIG. 5 is a diagram of an example of a notifying system, according to the principles described herein.

FIG. 5 is a diagram of an example of a notifying system (500), according to the principles described herein. The notifying system (500) includes an obtaining engine (502), an analyzing engine (504), an identifying engine (506), and a notifying engine (508). In this example, the system (500) also includes a determining engine (510), an applying engine (512), and an updating engine (514). The engines (502, 504, 506, 508, 510, 512, 514) refer to a combination of hardware and program instructions to perform a designated function. Each of the engines (502, 504, 506, 508, 510, 512, 514) may include a processor and memory. The program instructions are stored in the memory and cause the processor to execute the designated function of the engine.

The obtaining engine (502) obtains, from a database, opportunities, the opportunities representing a complex record structure in the database, in which each of the opportunities captures a number of fields of metadata. In one example, the obtaining engine (502) obtains, from a database, the opportunities according to factors such as an event, a time, a function, other factors, or combinations thereof. Further, in one example, the obtaining engine (502) obtains opportunities that have yet to be analyzed.

The analyzing engine (504) analyzes the metadata associated with the opportunities to identify patterns for the opportunities. In one example, the metadata for each of the opportunities includes a design specification, a platform specification, a fixpack specification, a version specification, an OS specification, a time line, a risk, a cost, a performance result, an integration middleware specification, members associated with the opportunities, an upgrade, a product, a staging, other metadata, or combinations thereof. In one example, the analyzing engine (504) compares metadata for an opportunity having a less mature maturity level with metadata for an opportunity having a more mature maturity level.

The identifying engine (506) identifies, based on the patterns, correlations for the opportunities. In one example, the identifying engine (506) identifies a correlation for each of the opportunities. In another example, the identifying engine (506) identifies several correlations for each of the opportunities.

The notifying engine (508) notifies, based on the correlations, a user about relevant data for the opportunities. In one example, the relevant data includes information to aid the user in maximizing the success for each of the opportunities. Further, the notifying engine (508) notifies the user via email, via a UI, via an alert, other methods, or combinations thereof.

The determining engine (510) determines a maturity level for each of the opportunities. In one example, the determining engine (510) determines the maturity level for the opportunities as a range. In another example, the determining engine (510) symbolically determines the maturity level for the opportunities.

The applying engine (512) applies a weight to the metadata associated with each of the opportunities to determine the relevant data that is used to notifying the user. In one example, the weight may be a range from 0 to 10, where 0 represents no weight to be applied to the metadata and 10 represents the greatest weight to be applied to the metadata by the applying engine (512).

The updating engine (514) updates the database with the correlations and the relevant data associated with the opportunities. In one example, the updating engine (514) updates the metadata associated with one opportunity. In another example, the updating engine (514) updates the metadata associated with several opportunities.

Figure 6:
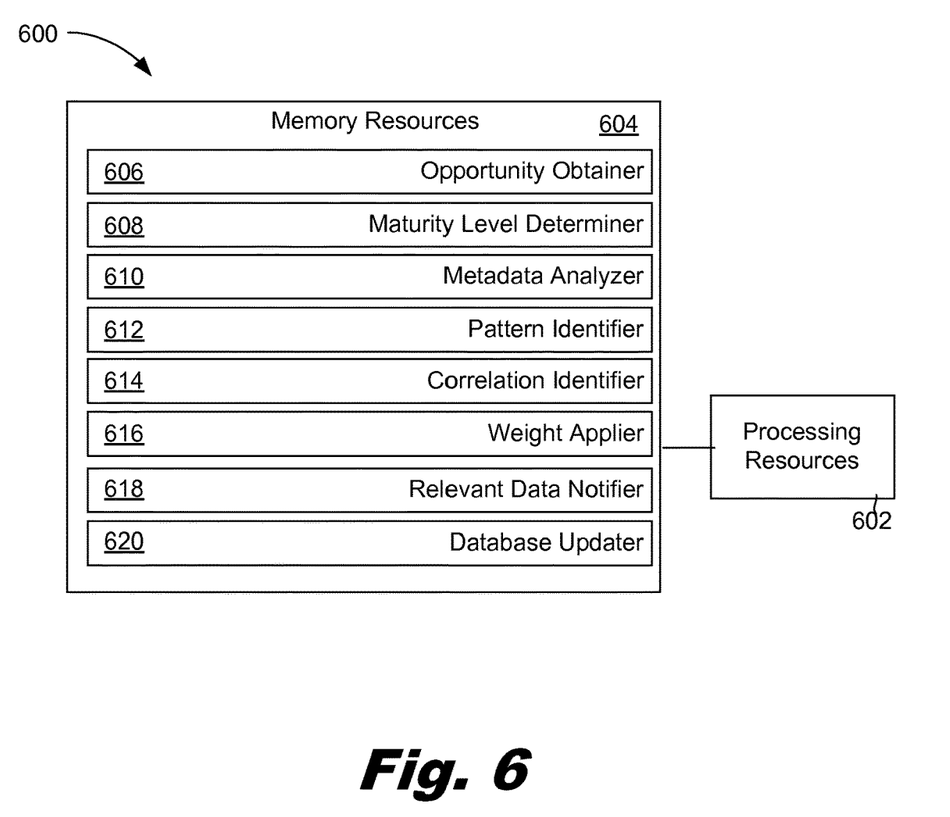
FIG. 6 is a diagram of an example of a notifying system, according to the principles described herein.

FIG. 6 is a diagram of an example of a notifying system (600), according to the principles described herein. In this example, the notifying system (600) includes processing resources (602) that are in communication with memory resources (604). Processing resources (602) include at least one processor and other resources used to process programmed instructions. The memory resources (604) represent generally any memory capable of storing data such as programmed instructions or data structures used by the notifying system (600). The programmed instructions shown stored in the memory resources (604) include an opportunity obtainer (606), a maturity level determiner (608), a metadata analyzer (610), a pattern identifier (612), a correlation identifier (614), a weight applier (616), a relevant data notifier (618), and a database updater (620).

The memory resources (604) include a computer readable storage medium that contains computer readable program code to cause tasks to be executed by the processing resources (602). The computer readable storage medium may be tangible and/or physical storage medium. The computer readable storage medium may be any appropriate storage medium that is not a transmission storage medium. A non-exhaustive list of computer readable storage medium types includes non-volatile memory, volatile memory, random access memory, write only memory, flash memory, electrically erasable program read only memory, or types of memory, or combinations thereof.

The opportunity obtainer (606) represents programmed instructions that, when executed, cause the processing resources (602) to obtain, from a database, opportunities, the opportunities representing a complex record structure in the database, in which each of the opportunities captures a number of fields of metadata. The maturity level determiner (608) represents programmed instructions that, when executed, cause the processing resources (602) to determine a maturity level for each of the opportunities.

The metadata analyzer (610) represents programmed instructions that, when executed, cause the processing resources (602) to analyze the metadata associated with the opportunities. The pattern identifier (612) represents programmed instructions that, when executed, cause the processing resources (602) to identify patterns for the opportunities.

The correlation identifier (614) represents programmed instructions that, when executed, cause the processing resources (602) to identify, based on the patterns, correlations for the opportunities. The weight applier (616) represents programmed instructions that, when executed, cause the processing resources (602) to apply a weight to the metadata associated with each of the opportunities to determine the relevant data that is used to notifying the user.

The relevant data notifier (618) represents programmed instructions that, when executed, cause the processing resources (602) to notify, based on the correlations, a user about relevant data for the opportunities. The database updater (620) represents programmed instructions that, when executed, cause the processing resources (602) to update the database with the correlations and the relevant data associated with the opportunities.

Further, the memory resources (604) may be part of an installation package. In response to installing the installation package, the programmed instructions of the memory resources (604) may be downloaded from the installation package's source, such as a portable medium, a server, a remote network location, another location, or combinations thereof. Portable memory media that are compatible with the principles described herein include DVDs, CDs, flash memory, portable disks, magnetic disks, optical disks, other forms of portable memory, or combinations thereof. In other examples, the program instructions are already installed. Here, the memory resources can include integrated memory such as a hard drive, a solid state hard drive, or the like.

In some examples, the processing resources (602) and the memory resources (604) are located within the same physical component, such as a server, or a network component. The memory resources (604) may be part of the physical component's main memory, caches, registers, non-volatile memory, or elsewhere in the physical component's memory hierarchy. Alternatively, the memory resources (604) may be in communication with the processing resources (602) over a network. Further, the data structures, such as the libraries, may be accessed from a remote location over a network connection while the programmed instructions are located locally. Thus, notifying system (600) may be implemented on a user device, on a server, on a collection of servers, or combinations thereof.

The notifying system (600) of FIG. 6 may be part of a general purpose computer. However, in alternative examples, the notifying system (600) is part of an application specific integrated circuit.

The preceding description has been presented to illustrate and describe examples of the principles described. This description is not intended to be exhaustive or to limit these principles to any precise form disclosed. Many modifications and variations are possible in light of the above teaching.

The flowchart and block diagrams in the figures illustrate the architecture, functionality, and operations of possible implementations of systems, methods, and computer program products. In this regard, each block in the flowchart or block diagrams may represent a module, segment, or portion of code, which has a number of executable instructions for implementing the specific logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration and combination of blocks in the block diagrams and/or flowchart illustration, can be implemented by special purpose hardware-based systems that perform the specified functions or acts, or combinations of special purpose hardware and computer instructions.

The terminology used herein is for the purpose of describing particular examples, and is not intended to be limiting. As used herein, the singular forms "a," "an" and "the" are intended to include the plural forms as well, unless the context clearly indicated otherwise. It will be further understood that the terms "comprises" and/or "comprising" when used in the specification, specify the presence of stated features, integers, operations, elements, and/or components, but do not preclude the presence or addition of a number of other features, integers, operations, elements, components, and/or groups thereof.

What is claimed is:

1. A customer relationship management (CRM) system for automatically notifying a user about relevant data for a record structure, the system comprising a processor and memory with instructions for the processor to implement:
    an obtaining engine of the CRM system to obtain, from a database, record structures, each record structure comprising a number of fields of metadata;
    a determining engine of the CRM system to reduce a number of record structures that are compared against a target record structure by:
        determining a maturity level for each obtained record structure; and
        responsive to a determination that a record structure is more mature than the target record structure, selecting the record structure to be presented to the analyzing engine for comparison with the target record structure as part of a reduced set, the reduced set comprising record structures that are more mature than the target record structure;
    an analyzing engine of the CRM system to:
        analyze the metadata associated with the reduced set of record structures including comparing the metadata from more mature record structures with metadata from the target record structure as determined by the determining engine to:
            identify patterns for the record structures; and
            determine a common footprint, based on overlapping metadata, between record structures at different maturity levels;
    an identifying engine of the CRM system to identify, based on the patterns discovered by the analyzing engine, correlations for the record structures that identify when data from a more mature record structure is determined as relevant to a less mature record structure;
    an applying engine of the CRM system to apply a weight to the metadata associated with each of the record structures to determine relevant data that is used to notify a user;
    a user interface (UT) of the CRM system for the user to generate a template for the less mature record structure based on the correlations and patterns of metadata between the less mature record structure and the more mature record structures;
    a notifying engine of the CRM system to, via at least one of an email, user interface, text message, alert, widget, or program notification, notify the user who is associated with the less mature record structure, based on the correlations, of the relevant data from the more mature record structure that was that was determined as relevant for the less mature record structure by the analyzing engine so that the relevant data from the more mature record structure is made available to the user to guide progress in the less mature record structure; and
    an updating engine of the CRM system to update the database with the correlations and the relevant data associated with the less mature record structure.

2. The system of claim 1, in which the metadata for each of the record structures comprises a design specification, a platform specification, a fixpack specification, a version specification, an operating system (OS) specification, a time line, a risk, a cost, a performance result, an integration middleware specification, members associated with the record structures, an upgrade, a product, a staging, or combinations thereof.

3. The system of claim 1, in which the relevant data comprises information to aid the user in maximizing success for each of the record structures.

4. A computer program product for automatically notifying a user about relevant data for record structures in a customer relationship management (CRM) system, comprising:
    a tangible computer readable storage medium, said tangible computer readable storage medium comprising computer readable program code embodied therewith, said computer readable program code comprising program instructions that, when executed, causes a processor to:
        obtain, from a database of the CRM system, record structures, each record structure comprising a number of fields of metadata;
        with the processor of the CRM system reduce a number of record structures that are compared against a target record structure by:
            determining a maturity level for each obtained record structure;
            responsive to a determination that a first record structure is more mature than a target record structure, selecting the first record structure to be presented to the analyzing engine for comparison with the target record structure to the analyzing engine as part of a reduced set, the reduced set comprising record structures that are more mature than the target record structure; and
            responsive to a determination that a second record structure is less mature than the target record structure, excluding the second record structure from being presented to the analyzing engine as part of the reduced set;
        with the processor of the CRM system, analyze metadata associated with the reduced set of record structures including comparing the metadata from more mature record structures with metadata from the target record structure to identify related record structures;
        with the processor of the CRM system, determine a common footprint between related record structures at different maturity levels, based on overlapping metadata;
        identify with the processor of the CRM system, based on the patterns discovered by the analyzing, correlations for the record structures that identify when data from a more mature record structure is determined as relevant to a less mature record structure;

receive a user-proposed template for the less mature record structure based on the correlations and patterns of metadata between the less mature record structure and the more mature opportunities, wherein the templated comprises pre-population of the less mature record structure template with information based on the correlations;

notify with the processor of the CRM system and via at least one of an email, user interface, text message, alert, widget, or program notification, based on the correlations, a user associated with the less mature record structure of:
- the relevant data from the more mature record structure that was determined as relevant for the less mature record structure so that the relevant data from the more mature record structure is made available to the user to guide progress in the less mature record structure; and
- a relevant percentage indicating a relevance for the relevant data.

5. The product of claim 4, further comprising computer readable program code comprising program instructions that, when executed, cause said processor to determine a maturity level for each of the record structures.

6. The product of claim 4, further comprising computer readable program code comprising program instructions that, when executed, cause said processor to apply a weight to the metadata associated with each of the record structures to determine the relevant data that is used to notify the user.

7. The product of claim 4, further comprising computer readable program code comprising program instructions that, when executed, cause said processor to update the database with the correlations and the relevant data associated with the record structures.

8. The product of claim 4, further comprising computer readable program code comprising program instructions that, when executed, cause said processor to compare metadata for a record structure having a less mature maturity level with metadata for a record structure having a more mature maturity level.

9. The product of claim 4, further comprising computer readable program code comprising program instructions that, when executed, cause said processor to obtain the metadata, in which the metadata for each of the record structures comprises a design specification, a platform specification, a fixpack specification, a version specification, an operating system (OS) specification, a time line, a risk, a cost, a performance result, an integration middleware specification, members associated with the record structures, an upgrade, a product, a staging, or combinations thereof.

10. A customer relationship management (CRM) system for automatically notifying a user about relevant data for record structures, the system comprising a processor and memory with instructions for the processor to implement:
- a determining engine of the CRM system to reduce a number of record structures that are compared against a target record structure by:
  - determining a maturity level for each of a plurality of record structures, each record structure comprising a number of fields of metadata;
  - responsive to a determination that a first record structure is more mature than a target record structure, selecting the first record structure to be presented to the analyzing engine for comparison with the target record structure as part of a reduced set, the reduced set comprising record structures that are more mature than the target record structure; and
  - responsive to a determination that a second record structure is less mature than the target record structure, excluding the second record structure from being presented to the analyzing engine as part of the reduced set;
- an analyzing engine of the CRM system to analyze the metadata associated with the reduced set of record structures including comparing metadata of just the more mature record structure with metadata of the target record structure to:
  - detect metadata overlap between metadata of the more mature record structure with metadata of the target record structure;
  - identify patterns indicating a relation between the more mature record structure and the less mature record structure; and
  - determine a common footprint, based on overlapping metadata, between the more mature record structure and the less mature record structure;
- an identifying engine of the CRM system to:
  - identify, based on the patterns discovered by the analyzing engine:
    - correlations between the more mature record structure and the less mature record structure; and
    - data from the more mature record structure that is relevant to the less mature record structure;
  - apply a tag to the more mature record structure as potentially more relevant to the less mature record structure;
- a user interface of the CRM system with tools for the user to generate a template for the less mature record structure based on the correlations and patterns of metadata between the less mature record structure and the more mature record structures;
- a notifying engine of the CRM system to:
  - notify, via at least one of an email, user interface, text message, alert, widget, or program notification, the user who is associated with the less mature record structure, of:
    - the relevant data from the more mature record structure that was determined as relevant for the less mature record structure by the analyzing engine such that the relevant data from the more mature record structure is made available to the user to guide progress in the less mature record structure; and
    - a relevant percentage indicating a relevance of the relevant data; and
- an updating engine of the CRM system to update the database with the correlations and the relevant data associated with the less mature record structure to prevent constant database analysis.

11. The system of claim 10, the processor and memory to further implement an applying engine to apply a weight to the metadata associated with each of the record structures to determine relevant data that is used to notify a user.

12. The system of claim 10, the processor and memory to further implement an updating engine to update the database with the correlations and the relevant data associated with the less mature record structure.

13. The system of claim 10, wherein the relevant data indicates how the less mature record structure may avoid potential issues that were encountered with the more mature record structure.

14. The system of claim 10, wherein the analyzing engine identifies a pattern based on overlap of metadata between the less mature and more mature record structures.

15. The system of claim 11, further comprising a user interface to permit the user to indicate a weight associated with a particular type of metadata.

16. The system of claim 15, wherein a weighted type of metadata is metadata describing performance results.

* * * * *